United States Patent
Yamamoto

(10) Patent No.: US 6,328,243 B1
(45) Date of Patent: Dec. 11, 2001

(54) REEL DEVICE FOR WIRE HARNESS

(75) Inventor: Takatatsu Yamamoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/583,756

(22) Filed: May 31, 2000

(30) Foreign Application Priority Data

Jun. 18, 1999 (JP) .................................................. 11-173368

(51) Int. Cl.⁷ .................................................. B65H 75/48
(52) U.S. Cl. .................................... 242/378.1; 191/12.2 R
(58) Field of Search ................................ 242/378, 378.1, 242/378.2, 378.3, 380; 191/12.2 R, 12.2 A, 12.4

(56) References Cited

U.S. PATENT DOCUMENTS

| | | | |
|---|---|---|---|
| 3,412,951 | * | 11/1968 | Ober .................. 191/12.2 R |
| 3,657,491 | * | 4/1972 | Ryder et al. .......... 242/378 |
| 4,733,832 | * | 3/1988 | Napierski .............. 242/378 |
| 4,757,955 | * | 7/1988 | Simmons ............... 242/378 |
| 4,874,138 | * | 10/1989 | Kettenring ............ 191/12.2 R |
| 5,094,396 | * | 3/1992 | Burke .................. 242/378 |
| 5,332,171 | * | 7/1994 | Steff ................... 242/378 |
| 5,797,558 | * | 8/1998 | Peterson et al. ....... 242/378.2 |

FOREIGN PATENT DOCUMENTS 63-176272A 7/1988 (JP) .
11-116145A 4/1999 (JP) .

\* cited by examiner

*Primary Examiner*—John M. Jillions
(74) *Attorney, Agent, or Firm*—Morgan, Lewis & Bockius LLP

(57) ABSTRACT

A reel device is assembled with a wire harness routed between a fixed member and a movable member. A casing has a first port to which a fixed first portion of the wire harness is fixed and lead out therefrom, and a second port from a movable second portion of the wire harness is lead out. A roller is rotatably provided in the casing. The roller includes a partition plate for partitioning inside of the casing a first accommodating space and a second accommodating space. A shaft member is formed on the partition plate so as to be located in the first accommodating space, on which the first portion of the wire harness is wound. A reel drum is formed on the partition plate so as to be located in the second accommodating space and having a belt member a first end of which is fixed thereon. The reel drum winds a predetermined length of the second portion of the wire harness thereon together with the belt member the second end of which is attached to the second portion of the wire harness. A notch is formed on an outer periphery of the partition plate, to which a third portion defining a boundary between the first and second portions of the wire harness is engaged. A reel spring is provided in the reel drum for urging the roller toward a direction for taking up the second portion of the wire harness into the casing.

5 Claims, 8 Drawing Sheets

REEL DEVICE FOR WIRE HARNESS

BACKGROUND OF THE INVENTION

The present invention relates to a reel device for a wire harness which is assembled onto a wire harness for being routed between a fixed body and a movable member, and which is suitable for use for a wire harness which is routed between, for example, the vehicle body of a vehicle such as an automobile and a door which is openably mounted therein.

Various electric equipment such as a motor for a power window and a door-mounted speaker are generally assembled in a door for a vehicle such as an automobile, and a wire harness needs to be routed between the vehicle body and the door so as to electrically connect such electric equipment on the one hand, and a power source, a control unit, and various sensors located on the vehicle body side on the other hand.

FIG. 14 shows a related reel device for a flat-cable disclosed in Japanese Patent Publication No. 11-116145A. This reel device is comprised of a flat cable 72 having a distal end portion connected to a movable connector 70 and a proximal end portion connected to a fixed connector 71; a fixed shaft member 73 on which the fixed connector 71 is disposed; and a carrier 74 supported by the shaft member 73 and adapted to rotate around its outer periphery. The arrangement provided is such that the carrier 74 is drawn out in a direction opposite to the taking-up direction of the flat cable 72, and the flat cable 72 is taken up onto an outer peripheral face of the shaft member 73 and an outer peripheral face of the carrier 74 in such a manner as to be oriented in mutually opposite directions as the carrier 74 is rotated.

In addition, FIGS. 15 and 16 show another related reel device for a wire harness disclosed in Japanese Patent Publication No. 63-176272A. In this reel device, a movable connector 81 is disposed at one end of a flat cable 80, while a fixed connector 82 is disposed at the other end thereof. A lengthwise intermediate point of the flat cable 80 is passed through an opening 84 provided in a side face of a reel body 83, and is fixed to the reel body 83 in the vicinity of the opening 84. One half of the flat cable 80 extending from the intermediate point to the movable connector 81 is wound around the reel body 83, and can be drawn out from a casing 85 against the spring force of a reel spring. The remaining half of the flat cable 80 is placed on the outer side of the reel body 83 and is positioned in such a manner as to be capable of being tightened around an extended shaft of the reel body 83. Further, the fixed connector 82 is provided in such a manner as to be exposed on the outer side of the casing 85.

The above-described former and latter related techniques have the following problems, respectively.

(1) Each of the related techniques is a reel device for a flat cable, and the apparatus is difficult to be assembled onto a wire harness composed of a plurality of electric wires (wires having circular cross sections) which are routed between a fixed member and a movable member.

(2) Each time the flat cable is drawn out from the casing or rewound into the casing depending on the movement of the movable member, a force is applied to the flat cable, and the stress to which the flat cable is subjected is large. Hence, there is a possibility of the flat cable becoming disconnected.

(3) Connectors to be connected to other wires need to be provided at opposite ends of the flat cable, and connectors are also required on the other wire sides. In addition, since the cost of the flat cable itself is high, the manufacturing cost increases.

(4) The operation of assembling the flat cable into the casing is troublesome. For example, with the above-described latter related technique, a troublesome operation is required in which the intermediate point of the flat cable 80 is passed through the opening 84 in the reel body 83, and its one half is wound around the reel body 83.

SUMMARY OF THE INVENTION

The invention has been devised in view of the above-described problems of the related arts, and its object is to provide a reel device which permits easy assembly onto an elongated wire harness at its arbitrary position, and which reduces stress on the electric wires and makes it possible to reduce the manufacturing cost.

In order to achieve the above object, according to the present invention, there is provided a reel device assembled with a wire harness routed between a fixed member and a movable member, comprising:

a casing having a first port to which a fixed first portion of the wire harness is fixed and lead out therefrom, and a movable second port from a second portion of the wire harness is lead out;

a roller rotatably provided in the casing, the roller including a partition plate for partitioning inside of the casing a first accommodating space and a second accommodating space;

a shaft member formed on the partition plate so as to be located in the first accommodating space, on which the first portion of the wire harness is wound;

a reel drum formed on the partition plate so as to be located in the second accommodating space and having a belt member a first end of which is fixed thereon, the reel drum for winding a predetermined length of the second portion of the wire harness thereon together with the belt member the second end of which is attached to the second portion of the wire harness;

a notch formed on an outer periphery of the partition plate, to which a third portion defining a boundary between the first and second portions of the wire harness is engaged; and a reel spring provided in the reel drum for urging the roller toward a direction for taking up the second portion of the wire harness into the casing.

In accordance with the above-described arrangement, when the reel device is assembled onto the wire harness, the belt member is drawn out, the third portion of the wire harness is retained at the notch, and the movable second portion of the wire harness is fixed to the belt member. If the belt member is released, the roller rotates by the urging force of the reel spring, so that the second portion of the wire harness, together with the belt member, is automatically taken up onto the outer periphery of the reel drum. The fixed first portion of the wire harness is loosely wound around the shaft member, is fixed at the first port of the casing, and is led to the outside. Moreover, since the slack wire harness can be accommodated in the first accommodating space, the apparatus can be assembled onto the elongated wire harness at its arbitrary position.

When a tensile force is applied to the belt member, this force is transmitted to the roller through the belt member. In turn, the roller rotates against the urging force of the reel spring, so that the second portion of the wire harness, together with the belt member, is drawn out to the outside. Meanwhile, when the tensile force is canceled, the roller rotates in the taking-up direction by the urging force, and this rotation is transmitted to the second portion of the wire harness through the belt member, thereby taking up the second portion of the wire harness together with the belt member. Thus, since practically no force is applied to the wire harness during both the drawing out and taking up of the movable-side wire harness, the stress to which the electric wires of the wire harness are subjected is small.

In addition, since this device is directly assembled onto the wire harness which is routed between the fixed member and the movable member, the device does not require connectors and can be manufactured at low cost.

Preferably, a retainer for fixing the second portion of the wire harness to either the fixed member or the movable member is provided on the second end of the belt member.

In accordance with the above-described arrangement, the movable second portion of the wire harness can be easily fixed to either the fixed member or the movable member by means of the retainer.

Preferably, the casing including an upper casing body and a lower casing body for accommodating the roller therebetween. The roller is rotatably supported on a cylindrical shaft member projected from a bottom face of the lower casing body.

In accordance with the above-described arrangement, the roller can be assembled easily onto the lower casing body merely by rotatably fitting to the cylindrical shaft member of the lower casing body. Thus, the assembling operation can be performed simply.

Preferably, the reel spring is a torsion coil spring or a spiral spring, one end of which is fixed on an outer peripheral face of the cylindrical shaft member, and the other end of which is fixed on an inner peripheral face of the reel drum. The reel spring is compressed between the bottom face of the lower casing body and a lower face of the partition plate of the roller.

In accordance with the above-described arrangement, even if the casing vibrates, a reaction force is constantly applied to that spring, and the vibration is absorbed by the spring. Accordingly, it is possible to prevent the occurrence of abnormal noise attributable to the free play of the reel spring.

DETAILED DESCRIPTION OF THE PREFERRED EMBODIMENTS

Hereafter, a description will be given of preferred embodiments of the reel device in accordance with the present invention.

Figure 1:
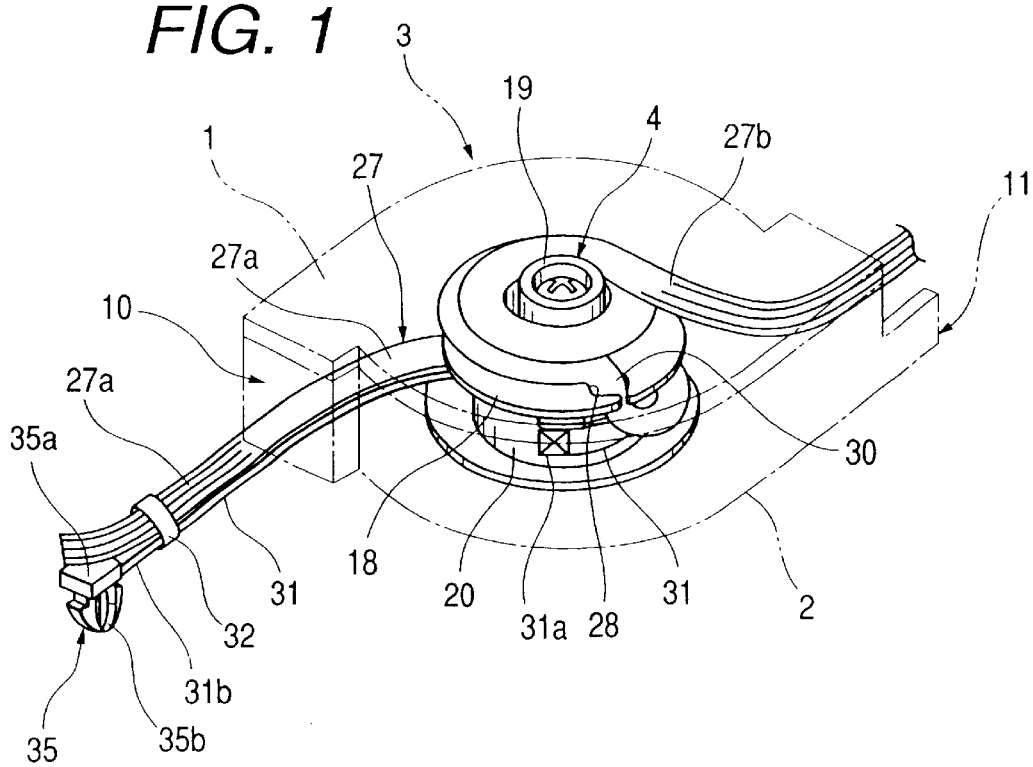
FIG. 1 is a perspective view illustrating a reel device in accordance with a first embodiment of the invention.
Figure 2:
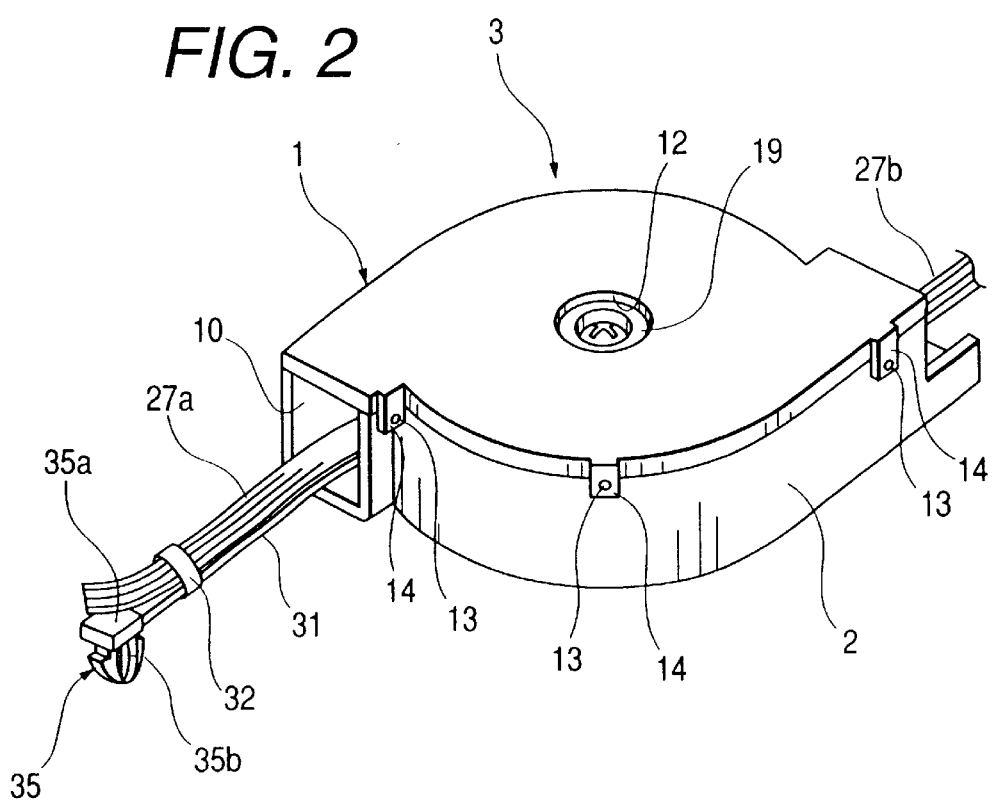
FIG. 2 is a perspective view illustrating the external appearance of the embodiment shown in FIG. 1.
Figure 3:
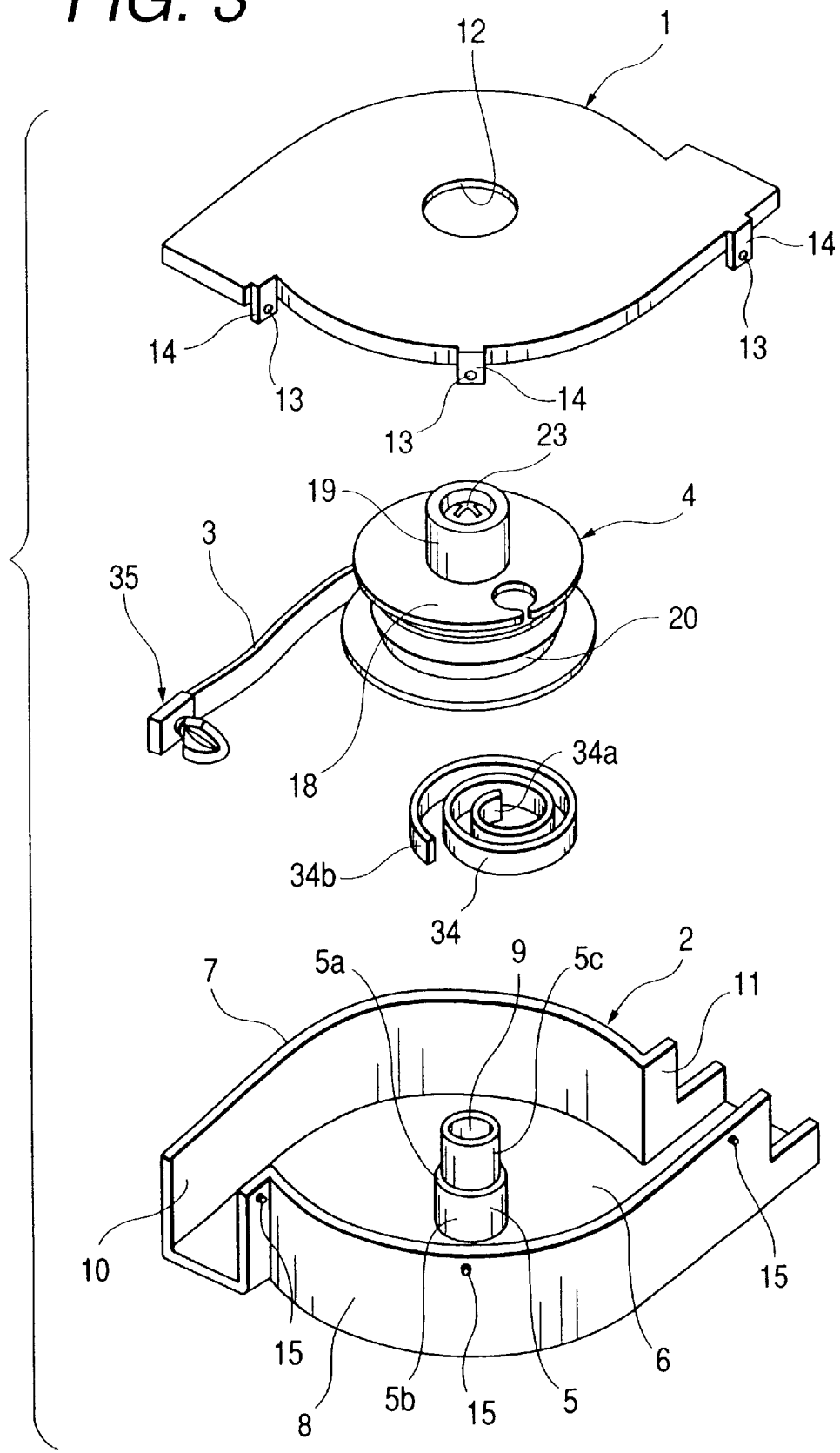
FIG. 3 is an exploded perspective view of the embodiment shown in FIG. 1.
Figure 4:
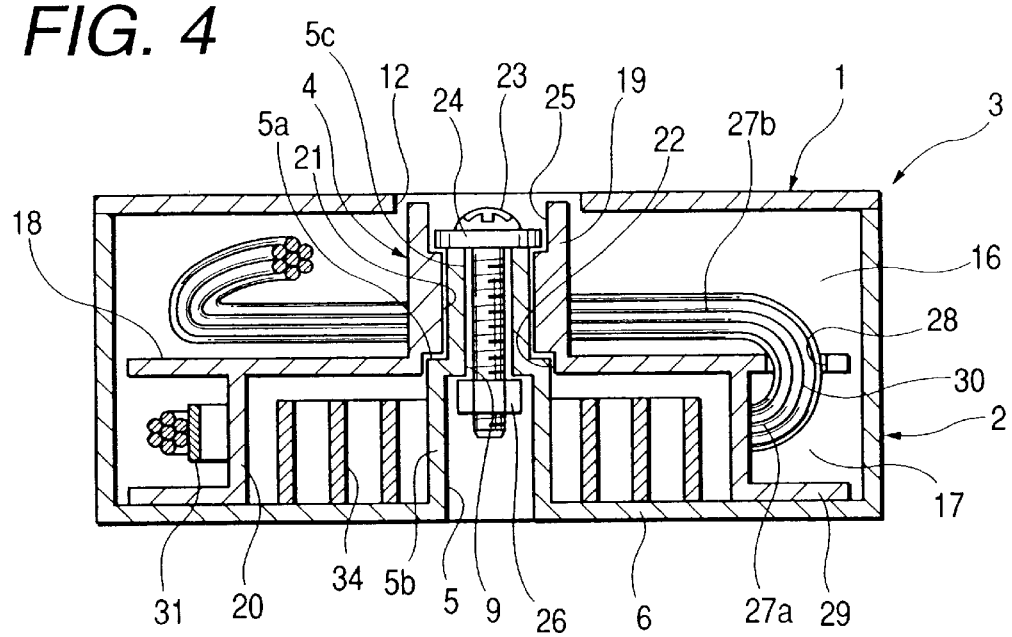
FIG. 4 is a vertical cross-sectional view of the embodiment shown in FIG. 1.

FIGS. 1 to 4 show a reel device in accordance with a first embodiment of the invention, in which FIG. 1 is a perspective view illustrating an internal structure of the apparatus, FIG. 2 is a perspective view illustrating the external appearance of the apparatus, FIG. 3 is an exploded perspective view of the apparatus, and FIG. 4 is a vertical cross-sectional view of the apparatus.

The reel device is an apparatus for establishing electrical connection between a fixed member and a movable member, e.g. between the vehicle body of a vehicle such as an automobile and a door which is openably mounted therein, and the apparatus is assembled onto a wire harness which is routed between the fixed body and the movable member. For instance, this reel device is used in a front door, a back door, a sunroof, a luggage door (the door of a trunk room), or the like of a vehicle such as an automobile. As shown in FIGS. 1 to 4, this reel device has a pair of upper and lower covers 1 and 2 which are combined to form a casing 3 in which two harness leading-out ports are formed, and a roller 4 which is rotatably provided in the casing 3.

As shown in FIGS. 3 and 4, the lower cover 2 has a bottom wall 6 having a tubular supporting shaft 5 formed projectingly on a central portion thereof, as well as a pair of opposing side walls 7 and 8 disposed uprightly on peripheral edges of the bottom wall 6. The supporting shaft is a hollow cylindrical portion whose upper and lower ends are open and which has a stepped portion 5a at its heightwise substantially intermediate portion, and a bolt insertion hole 9 is formed in its upper hollow cylindrical portion 5c having a smaller diameter than a lower hollow cylindrical portion 5b. In addition, harness leading-out ports 10 and 11 are formed by opposite ends of the side walls 7 and 8 at positions substantially symmetrical about the axis of the supporting shaft 5. Meanwhile, the upper cover 1 is a cover member for the lower cover 2 and has a circular bore 12 in its center, and projecting pieces 14 each having a locking hole 13 are formed at a plurality of (in this embodiment, six) positions in its peripheral edges. The upper and lower covers 1 and 2 are joined together as a plurality of (altogether six) engagement projections 15 which are respectively provided projectingly on the side walls 7 and 8 of the lower cover 2 are respectively fitted in the locking holes 13 in the projecting pieces 14.

As shown in FIGS. 3 and 4, the roller 4 has a partition plate 18 for partitioning the interior of the casing 3 into a first accommodating space 16 and a second accommodating space 17; a supporting shaft 19 and a hollow cylindrical reel drum 20 which are respectively provided on the upper side and the lower side of the partition plate 18 at its central portion; and a bottom plate 29 which extends from a lower end of the reel drum 20 in parallel with the partition plate 18 and comes into face contact with the bottom wall 6 of the lower cover 2. The roller 4 is rotatably provided in the casing 3. The supporting shaft 19 has a through hole 21 through which the aforementioned upper hollow cylindrical portion 5c is inserted, a circular recessed portion 22 which is rotatably fitted to the stepped portion 5a of the supporting shaft is formed in a lower portion of the supporting shaft 19. Further, a circular recessed portion 25 for accommodating a head of a bolt 23 and a washer 24 is formed in an upper portion of the supporting shaft 19. In a state in which the circular recessed portion 22 of the supporting shaft 19 is fitted to the stepped portion 5a of the supporting shaft, the upper hollow cylindrical portion 5c of the supporting shaft is fastened by a nut 26 and the bolt 23 inserted in the bolt insertion hole 9 by means of the washer 24, whereby the supporting shaft 19 of the roller 4 is set free between the stepped portion 5a and the washer 24 and is rotatably held on the lower hollow cylindrical portion 5b of the supporting shaft. As the bottom plate 29 of the roller 4 is brought into face contact with the bottom wall 6 of the lower cover 2 with the roller 4 thus assembled rotatably inside the lower cover 2, the roller 4 is able to rotate smoothly inside the casing 3.

A circular notched portion 28 for passing a wire harness 27 therethrough is provided in an outer periphery of the partition plate 18. The wire harness 27 is a continuous elongated member composed of a plurality of electric wires (wires having circular cross sections), and a bent portion 30 formed by bending a portion of the wire harness 27 is retained in the notched portion 28 (see FIGS. 1 and 4).

Figure 7A:
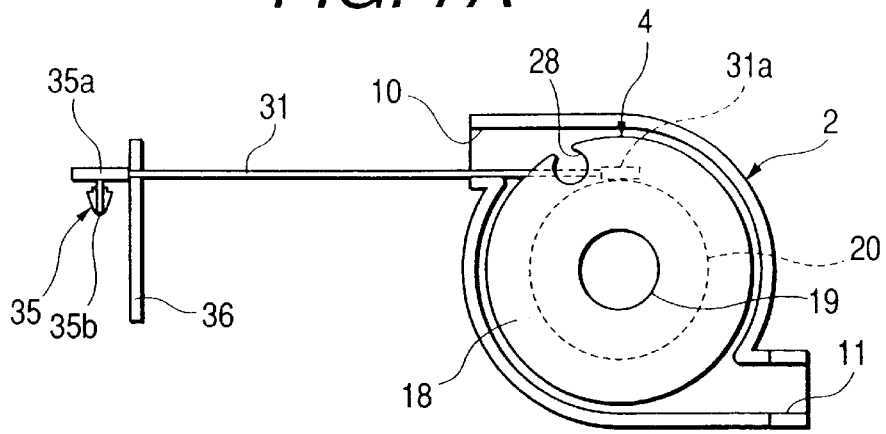
FIGS. 7A to 7C are explanatory diagrams illustrating the procedure of assembly onto the wire harness in the embodiment shown in FIG. 1.
Figure 7B:
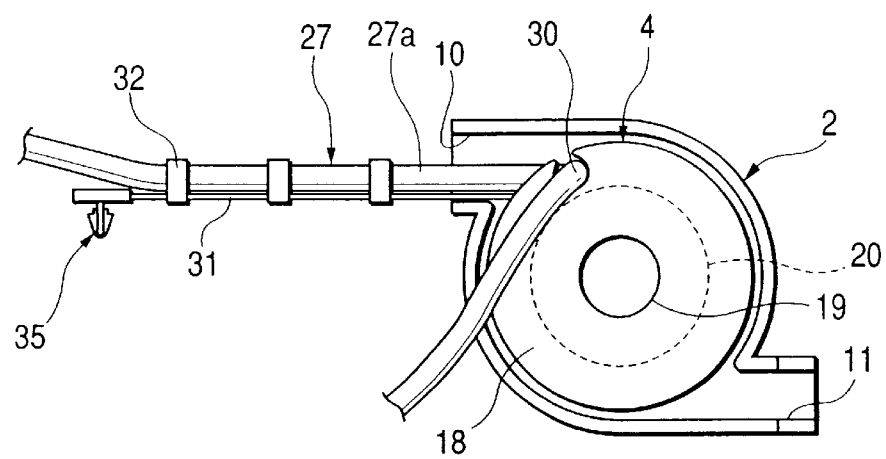

Of the wire harness 27, a movable-side wire harness 27a extending from the notched portion 28 to the interior of the second accommodating space 17 has one end 31 a fixed to a belt member 31 fixed to an outer periphery of the reel drum 20, is wound, together with the belt member 31, around an outer periphery of the reel drum 20 by a predetermined length, and extends to the outside from one harness leading-out port 10 of the casing 3. The movable-side wire harness 27a and the belt member 31 are fixed together by taping 32 at one or a plurality of locations (in this embodiment, three locations as shown in FIG. 7B).

Figure 5:
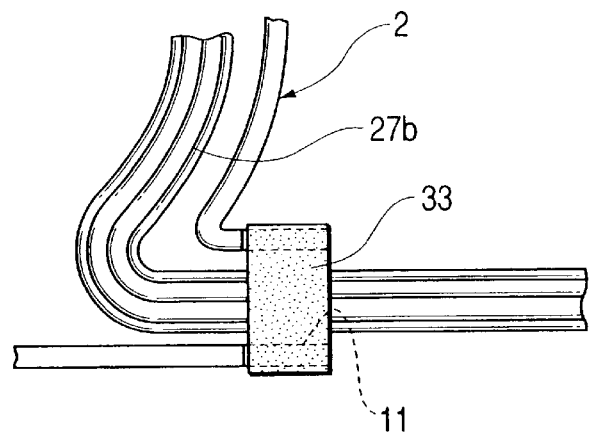
FIG. 5 is a plan view illustrating a portion where a wire harness is fixed to a casing of the embodiment shown in FIG. 1.

Meanwhile, of the wire harness 27, a fixed-side wire harness 27b which extends from the notched portion 28 in the roller 4 to the interior of the first accommodating space 16 is loosely wound around the supporting shaft 19, is accommodated in the first accommodating space 16, is fixed at the other harness leading-out port 11 of the casing 3, and extends to the outside from the harness leading-out port 11. As shown in FIG. 5, the fixed-side wire harness 27b is fixed to the other wire harness leading-out port 11 by means of taping 33, a band, or the like.

In addition, a reel spring (power spring) 34 for urging the roller 4 in the direction of rewinding the movable-side wire harness 27a into the casing 3 is accommodated inside the reel drum 20 of the roller 4. Namely, the reel spring 34 is accommodated in the reel drum 20 such that when a tensile force is applied to the belt member 31, and this force is transmitted to the roller 4 through the belt member 31 so as to rotate the roller 4, the diameter of the reel spring 34 is reduced, and when the tensile force is canceled, the reel spring 34 urges the roller 4 so as to rotate the roller 4 in the taking-up direction by means of its restoring force from the state of the reduced diameter. One end 34a of the reel spring 34 is fixed to the lower hollow cylindrical portion 5b of the supporting shaft, and its other end 34b is fixed to the reel drum 20.

Further, the belt member 31 is formed of flexible cloth, thin metal plate, or the like. A retainer 35 is fixed to an end portion (other end) 31b of that portion of the belt member 31 which extends to the outside from one harness leading-out port 10. This retainer 35 is made up of a main body 35a fixed to the end portion 31b and a clamp 35b provided projectingly on the main body 35a. The movable-side wire harness 27a is fixed as the clamp 35b is engaged in a retaining hole or a groove in a harness fixing portion (e.g., an inner panel of the door) of either the fixed member or the movable member. Instead of the clamp 35b, a retaining portion such as a retaining hole may be provided in the main body 35a of the retainer 35.

Next, referring to FIGS. 7A to 7C, a description will be given of the procedure of assembling the reel device having the above-described arrangement onto the wire harness. Here, a description will be given of a case in which the reel device is assembled onto the wire harness which is routed between the vehicle body (fixed member) and a door (movable member) of a vehicle such as an automobile.

First, the roller 4 in which the reel spring 34 is accommodated in the reel drum 20 thereof is rotatably assembled onto the lower cover 2 by means of the bolt 23 and the nut 267 as shown in FIG. 4. In this state, as shown in FIG. 7A, the belt member 31 is drawn out from the harness leading-out port 10 until the notched portion 28 in the partition plate 18 is brought to a position facing one harness leading-out port 10 in the lower cover 2 (in the casing 3), and the main body 35a of the retainer 35 is fixed by being engaged in a retaining groove in a jig 36.

Figure 6:
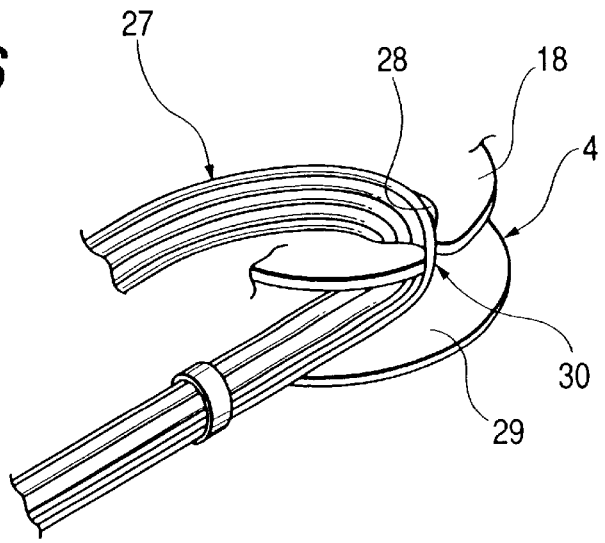
FIG. 6 is a perspective view illustrating a portion where the wire harness is fixed to a roller of the embodiment shown in FIG. 1.

Next, as shown in FIG. 7B, the bent portion 30 formed by bending a portion of the wire harness 27 is retained in the notched portion 28 in the partition plate 18 (see FIG. 6), and the movable-side wire harness 27a extending from the notched portion 28 toward the second accommodating space 17 side is fixed to the belt member 31 at a plurality of positions by the taping 32.

Next, if the fixation of the belt member 31 is canceled by removing the main body 35a from the jig 36, the roller 4 rotates clockwise from the position shown in FIG. 7B by the urging force of the reel spring 34. Hence, the movable-side wire harness 27a, together with the belt member 31, is drawn into the lower cover 2, and is automatically taken up onto the outer periphery of the reel drum 20 by a predetermined length (see FIG. 7C).

Figure 7C:
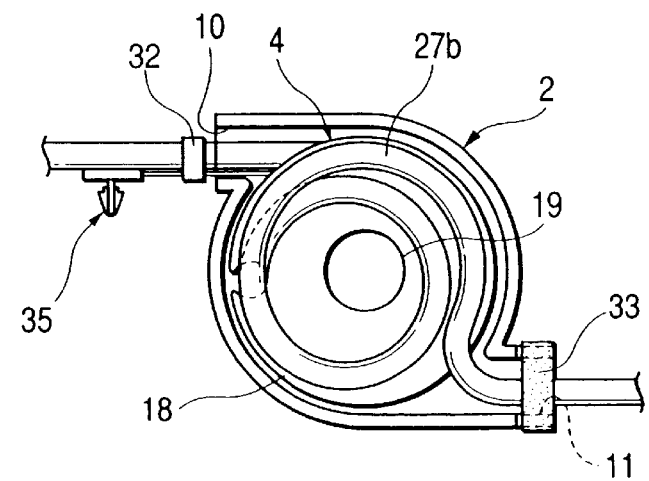

Next, the fixed-side wire harness 27b extending from the notched portion toward the first accommodating space 16 side is loosely wound around the supporting shaft 19 (is wound, for instance, clockwise from the notched portion 28) by an appropriate length corresponding to the length of the movable-side wire harness 27a wound around the reel drum 20 (see FIG. 7C). Subsequently, the fixed-side wire harness 27b is fixed to the other harness leading-out port 11 of the lower cover 2 by the taping 33, a band, or the like (see FIGS. 5 and 7C), and is led from the harness leading-out port 11 to the outside.

Subsequently, the upper cover 1 is fixed to the lower cover 2, as shown in FIGS. 2 and 4.

Finally, the clamp 35b of the retainer 35 is fixed to the harness fixing portion of either the vehicle body or the door, and the casing 3 is fixed to the other harness fixing portion by an unillustrated retainer, thereby completing the assembly onto the wire harness 27.

Figure 8A:
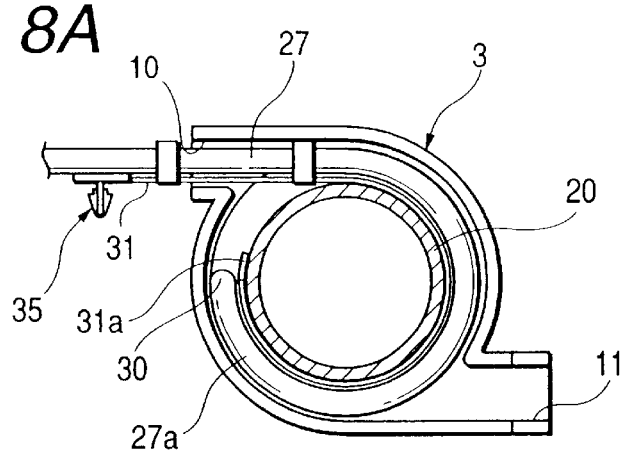
FIGS. 8A to 8C are diagrams explaining the operation of the embodiment shown in FIG. 1 and illustrate how the movable-side wire harness operates.
Figure 8B:
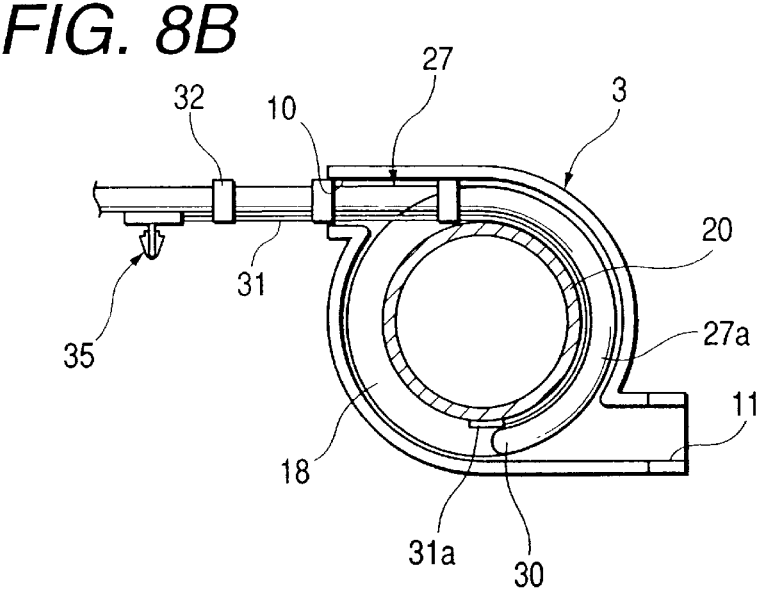
Figure 8C:
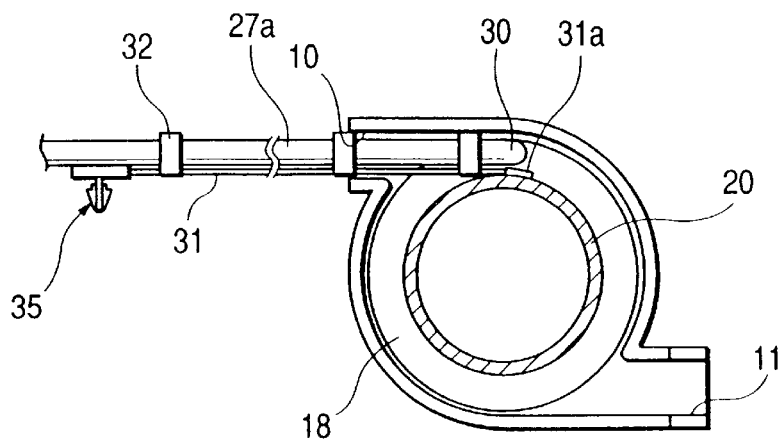
Figure 9A:
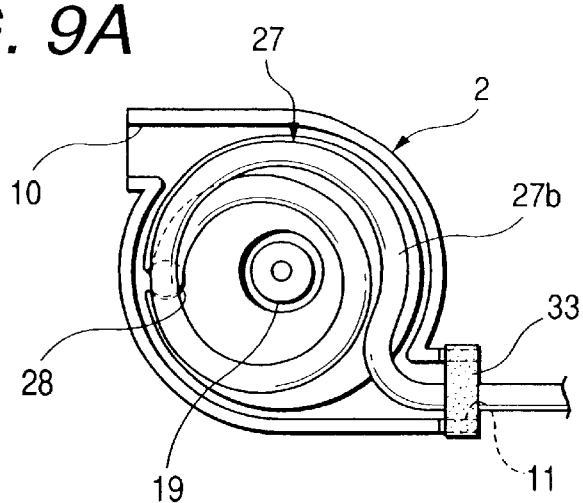
FIGS. 9A to 9C are diagrams explaining the operation and illustrate how the fixed-side wire harness operates.
Figure 9B:
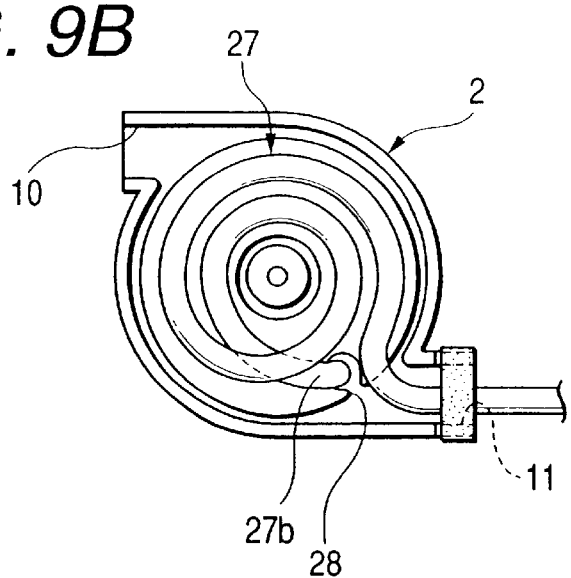
Figure 9C:
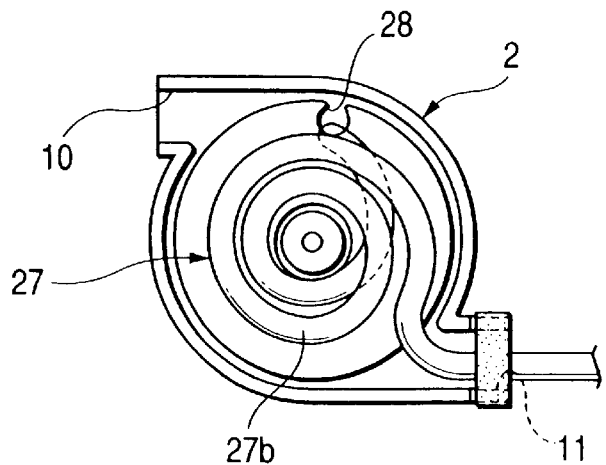

Next, referring to FIGS. 8A to 8C and 9A to 9C, a description will be given of the operation of the above-described reel device. FIGS. 8A to 8C are diagrams explaining the operation and illustrate how the movable-side wire harness operates. FIGS. 9A to 9C are diagrams explaining the operation and illustrate how the fixed-side wire harness operates.

First, as shown in FIG. 8A, if an openable member such as a door is opened, a tensile force is applied to the retainer 35, and this tensile force is transmitted to the roller 4 through the belt member 31, so that the roller 4 rotates counterclockwise in the drawing against the urging force of the reel spring 34. Due to this rotation, the movable-side wire harness 27a, together with the belt member 31, is drawn out from the harness leading-out port 10 (see FIG. 8B).

Subsequently, when the openable member is closed and the tensile force is canceled, the roller 4 is rotated clockwise from the position shown in FIG. 8C by the urging force of the reel spring 34. Since the belt member 31 is drawn into the casing 3 by this rotation, the movable-side wire harness 27a, together with the belt member 31, is taken up onto the outer periphery of the reel drum 20, and is returned to the state shown in FIG. 8A.

Meanwhile, as shown in FIG. 9A, the fixed-side wire harness 27b is loosely wound around the supporting shaft 19 of the roller 4 in the state in which the movable-side wire harness 27a has been retracted into the casing 3 as shown in FIG. 8A. In this state, if the roller 4 rotates counterclockwise in the drawing, the fixed-side wire harness 27b moves in the direction of being loosely wound around the supporting shaft 19 (see FIGS. 9B and 9C).

Subsequently, when the openable member is closed and the roller 4 is rotated clockwise from the position shown in FIG. 9C by the urging force of the reel spring 34, the fixed-side wire harness 27b moves in a loosening direction, and returns to the state shown in FIG. 9A.

In accordance with the reel device in the above-described embodiment, the assembling operation can be performed easily, as described above. Moreover, the slack wire harness can be accommodated in the first accommodating space 16. Accordingly, the reel device can be assembled onto the elongated wire harness at its arbitrary position.

Further, since practically no force is applied to the wire harness 27 during both the drawing out and taking up of the movable-side wire harness 27a, the stress to which the electric wires of the wire harness 7 are subjected is small.

In addition, since this device is directly assembled onto the wire harness which is routed between the fixed member and the movable member, the device does not require connectors and can be manufactured at low cost.

In addition, in accordance with the above-described embodiment, since the retainer 35 is provided on the end portion 31b of the belt member 31, the movable-side wire harness 27a can be easily fixed to the harness fixing portion of either the fixed member or the movable member.

Further, in accordance with the above-described embodiment, in the state in which the circular recessed portion 22 of the supporting shaft 19 of the roller 4 is fitted to the stepped portion 5a of the supporting shaft, the upper hollow cylindrical portion 5c of the supporting shaft is merely fastened by the nut 26 and the bolt 23 inserted in the bolt insertion hole 9 by means of the washer 24. As a result, the supporting shaft 19 is set free between the stepped portion 5a and the washer 24 and is rotatably held on the lower hollow cylindrical portion 5b of the supporting shaft. Accordingly, the roller 4 can be easily assembled onto the lower cover 2.

Figure 10:
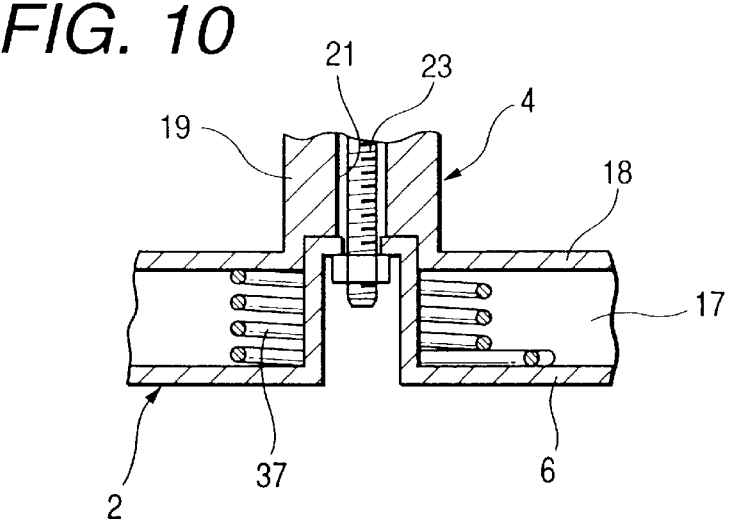
FIG. 10 is a partial cross-sectional view illustrating a reel device in accordance with a second embodiment of the invention.
Figure 11:
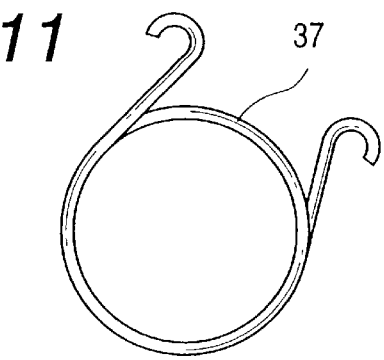
FIG. 11 is a plan view of a reel spring shown in FIG. 10.

FIGS. 10 and 11 show a reel device in accordance with a second embodiment of the above-described embodiment.

Although in the above-described embodiment the power spring is used as the reel spring 34, a torsion coil spring 37 shown in FIG. 11 is used as the reel spring 34 in this embodiment. One end of the torsion coil spring 37 is fixed to an outer periphery of the supporting shaft, and the other end thereof is fixed to an inner periphery of the reel drum 20. Further, the torsion coil spring 37 is compressed between the bottom wall 6 of the lower cover 2 and the partition plate 18 of the roller 4. By virtue of this arrangement, even if the casing 3 vibrates, a reaction force is constantly applied to the torsion coil spring 37, and the vibration is absorbed by the spring 37. Accordingly, it is possible to prevent the occurrence of abnormal noise attributable to the free play of the torsion coil spring (reel spring) 37.

Figure 12:
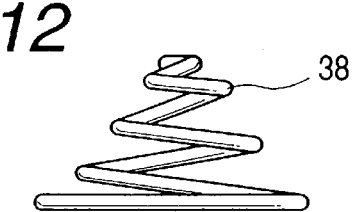
FIG. 12 is a front elevational view illustrating a reel spring in a reel spring according to a third embodiment of the invention.
Figure 13:
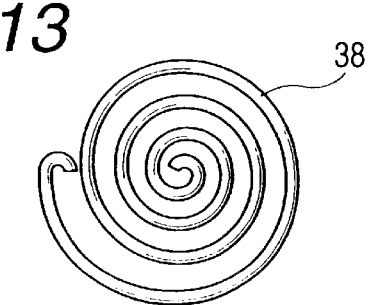
FIG. 13 is a plan view of the reel spring shown in FIG. 12.
Figure 14:
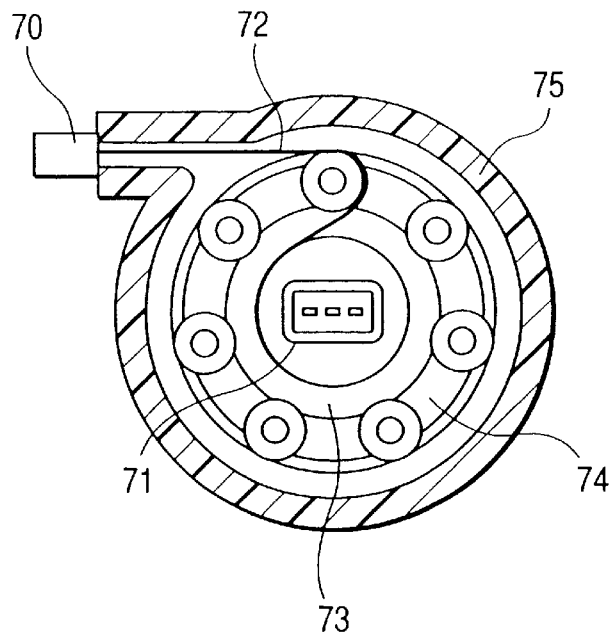
FIG. 14 is a horizontal cross-sectional view illustrating a first related reel device.
Figure 15:
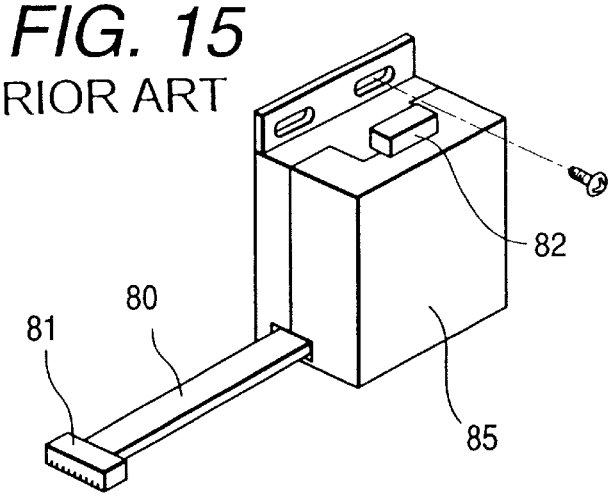
FIG. 15 is a perspective view illustrating a second related reel device.
Figure 16:
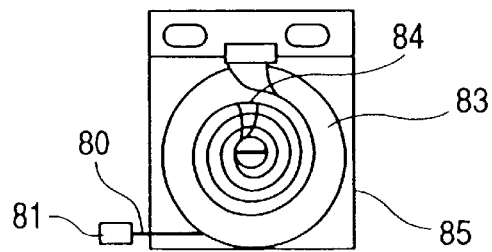
FIG. 16 is a plan view illustrating the interior of the second related reel device.

Furthermore, instead of the torsion coil spring 37, a spiral spring 38 such as the one shown in FIGS. 12 and 13 may be used as the reel spring 34 by being compressed in the same way as in the second embodiment. In this case as well, it is possible to prevent the occurrence of the abnormal noise.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A reel device assembled with a wire harness routed between a fixed member and a movable member, comprising:
   a casing having a first port to which a fixed first portion of the wire harness is fixed and lead out therefrom, and a second port from a movable second portion of the wire harness is lead out;
   a roller rotatably provided in the casing, the roller including a partition plate for partitioning inside of the casing a first accommodating space and a second accommodating space;
   a shaft member formed on the partition plate so as to be located in the first accommodating space, on which the first portion of the wire harness is wound;
   a reel drum formed on the partition plate so as to be located in the second accommodating space and having a belt member a first end of which is fixed thereon, the reel drum for winding a predetermined length of the second portion of the wire harness thereon together with the belt member the second end of which is attached to the second portion of the wire harness;
   a notch formed on an outer periphery of the partition plate, to which a third portion defining a boundary between the first and second portions of the wire harness is engaged; and
   a reel spring provided in the reel drum for urging the roller toward a direction for taking up the second portion of the wire harness into the casing.

2. The reel device as set forth in claim 1, wherein a retainer for fixing the second portion of the wire harness to either the fixed member or the movable member is provided on the second end of the belt member.

3. The reel device as set forth in claim 1, wherein the casing including an upper casing body and a lower casing body for accommodating the roller therebetween; and
   wherein the roller is rotatably supported on a cylindrical shaft member projected from a bottom face of the lower casing body.

4. The reel device as set forth in claim 3, wherein the reel spring is a torsion coil spring one end of which is fixed on an outer peripheral face of the cylindrical shaft member, and the other end of which is fixed on an inner peripheral face of the reel drum; and wherein the torsion coil spring is compressed between the bottom face of the lower casing body and a lower face of the partition plate of the roller.

5. The reel device as set forth in claim 3, wherein the reel spring is a spiral spring one end of which is fixed on an outer peripheral face of the cylindrical shaft member, and the other end of which is fixed on an inner peripheral face of the reel drum; and wherein the spiral spring is compressed between the bottom face of the lower casing body and a lower face of the partition plate of the roller.

* * * * *